United States Patent [19]

Tomimatsu

[11] Patent Number: 4,998,414
[45] Date of Patent: Mar. 12, 1991

[54] AIR CONDITIONING SYSTEM
[75] Inventor: Shigenao Tomimatsu, Takasaki, Japan
[73] Assignee: Sanden Corporation, Gunma, Japan
[21] Appl. No.: 357,630
[22] Filed: May 24, 1989

Related U.S. Application Data

[63] Continuation of Ser. No. 219,226, Jul. 15, 1988, abandoned.

[30] Foreign Application Priority Data

Jul. 15, 1987 [JP] Japan .......................... 62-108661[U]

[51] Int. Cl.$^5$ .............................. F25D 23/08
[52] U.S. Cl. .................. 62/259.3; 62/429; 174/5 R
[58] Field of Search ............ 62/259.3, 429, 262; 215/12 A, 13 R; 174/5 R; 324/551, 554; 493/949

[56] References Cited

U.S. PATENT DOCUMENTS

| | | | |
|---|---|---|---|
| 2,024,065 | 12/1935 | Schellens | 215/12.2 X |
| 2,498,661 | 2/1950 | Dybvig | 62/429 X |
| 2,583,901 | 1/1952 | Talley | 174/5 R X |
| 2,945,362 | 7/1960 | Gould et al. | 62/429 |
| 3,741,290 | 6/1973 | Nenadal | 62/262 X |
| 3,766,749 | 10/1973 | Livesay | 62/262 |
| 3,783,637 | 1/1974 | Woods | 62/429 X |
| 3,819,244 | 6/1974 | Paulick et al. | 62/262 X |
| 3,845,873 | 11/1974 | Bridges | 215/12.2 |
| 3,863,794 | 2/1975 | Hata | 215/12.2 |
| 4,607,499 | 8/1986 | Bolton et al. | 62/262 |
| 4,633,680 | 1/1987 | Lang et al. | 62/262 X |

OTHER PUBLICATIONS

U.S. Ser. No. 219,225, Jul. 15, 1988, Tomimatsu.
U.S. Ser. No. 1,220,511, Jul. 15, 1988, Tomimatsu.

Primary Examiner—William E. Tapolcai
Attorney, Agent, or Firm—Banner, Birch, McKie & Beckett

[57] ABSTRACT

An air conditioning system is disclosed which includes a compressor, a condenser, an evaporator, a first fan for the condenser, and a second fan for the evaporator. A case which encloses at least the compressor, the condenser, the evaporator, the first fan and the second fan comprises an inner housing, and an outer housing which encloses the inner housing. Exposed portions which project on the outer surface of the outer housing and the outer housing are made of insulating materials.

23 Claims, 6 Drawing Sheets

AIR CONDITIONING SYSTEM

This application is a continuation of application Ser. No. 219,226, filed July 15, 1988, now abandoned.

This application is related by subject matter to commonly assigned copending application Ser. Nos. 219,225 and 220,511 filed concurrently.

TECHNICAL FIELD

The present invention generally relates to an air conditioning system, and more particularly, to an air conditioning system which protects a user from electric shock during operation of the system.

BACKGROUND OF THE INVENTION

Figure 1:
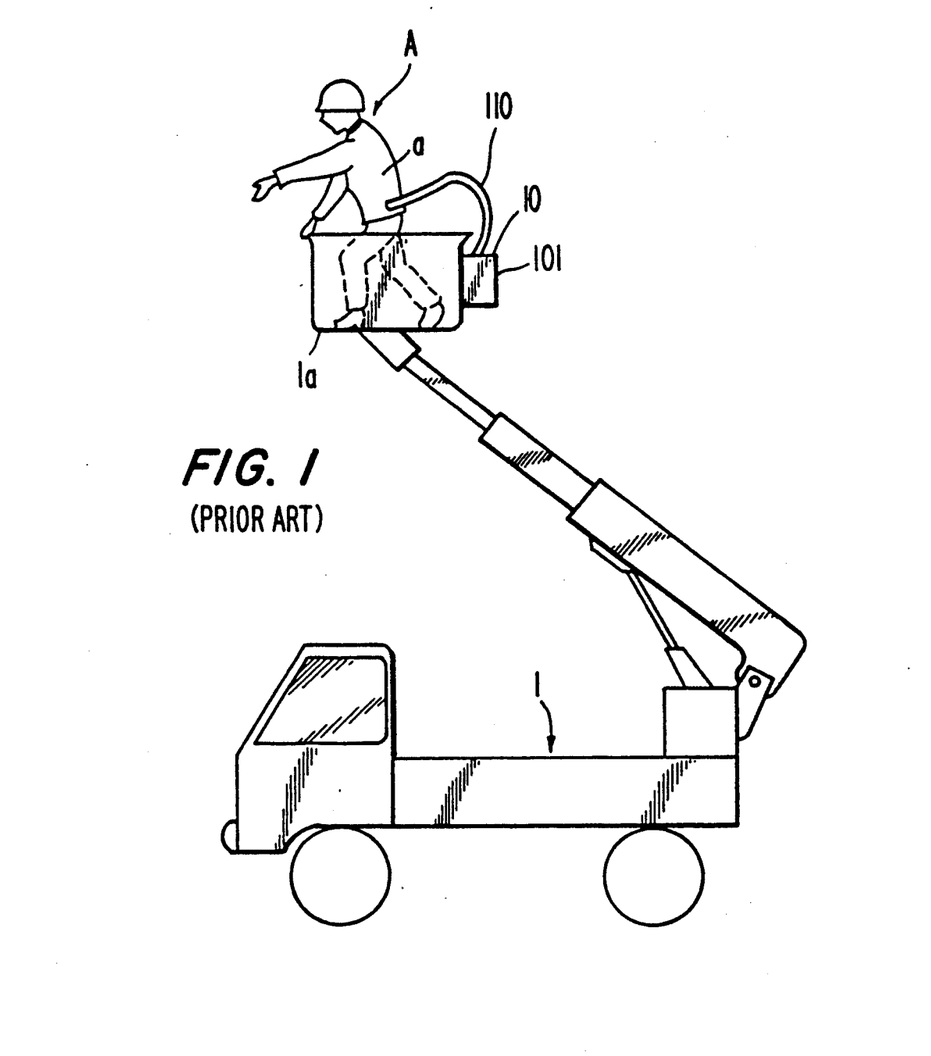
FIG. 1 is a schematic side view of showing operation on a live wire.

FIG. 1 shows a schematic side view of a working vehicle adapted for work on overhead power lines and which includes an air conditioning system for a worker.

Figure 2:
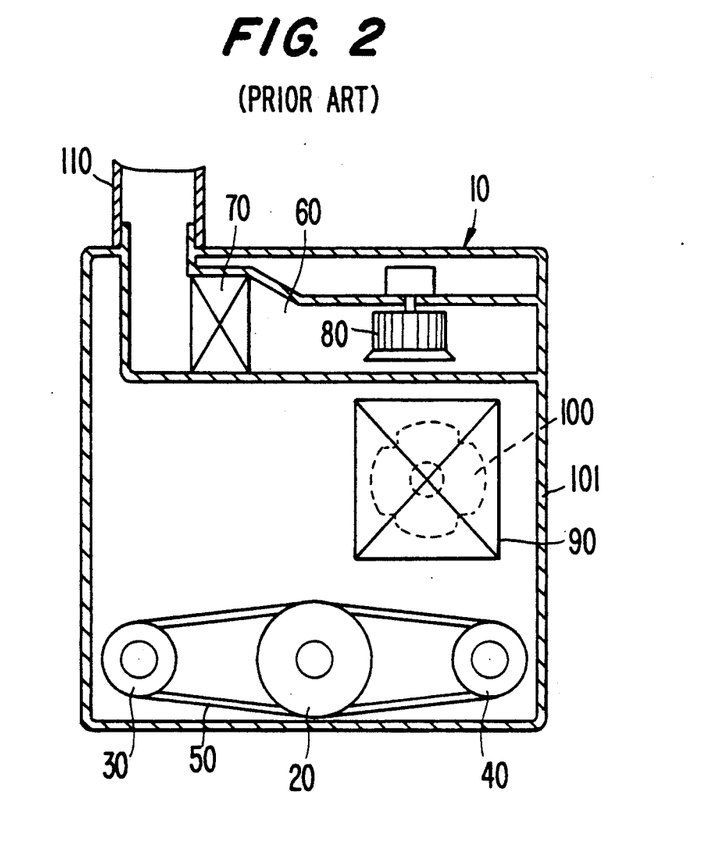
FIG. 2 is a schematic view of a conventional air conditioning system for a working vehicle for operation on a live wire.

Air conditioning system 10 is mounted on a side plate of lifter 1a. As shown in FIG. 2, air conditioning system 10 includes oil hydraulic motor 20, generator 30 and compressor 40, each of which is disposed in the lower portion of case 101. The rotational force of oil hydraulic motor 20 is transmitted to generator 30 and compressor 40 through belt 50. Upper passageway 60 is formed at the upper portion of case 101 and includes evaporator 70 and fan 80. Condenser 90 and fan 100 for condenser 90 are also disposed in case 101. When the air conditioning system is turned on, generator 30 and compressor 40 are driven in response to the rotational force of oil hydraulic motor 20. Generator 30 generates and transmits electricity to fans 80 and 100, whereby fans 80 and 100 are driven. Refrigerant in a refrigerant circuit is circulated through evaporator 70 and condenser 90 by the operation of compressor 40. Accordingly, air which flows into upper passageway 60 is cooled by evaporator 70 and sent to the interior of suit a of worker A through flexible hose 110. Flexible hose 110 is made of a plastic material. Suit a is made of rubber to insulate the worker and protect him from electric shocks.

In the above described air conditioning system, case 101 is conventionally made of a hard metal material so that heavy objects may be disposed therein. These heavy objects (for example the oil hydraulic motor 20 and compressor 40) are fixedly secured within case 101 by metal bolts. This metal construction is dangerous for a worker working in close proximity to power lines or other sources of electricity and increases the chances that the worker will be accidently injured or killed during the performance of his job. In order to decrease the possibility of such an occurrence, the metal case and any exposed portions thereof, including bolts, etc., are conventionally covered with insulating materials, for example, resin paints. The air conditioning system may also be placed as far away as possible from the place at which the worker is working in order to prevent accidents.

However, during the course of work, insulating materials which cover the exposed portions in the metal case can either chip or wear away. In addition, if the air conditioning system is disposed too far from the worker, cooled air sent from the air conditioning system to the interior of the suit a through hose 110 may be warmed significantly before reaching the worker. This decreases the overall effectiveness of the air conditioning system.

SUMMARY OF THE INVENTION

It is an object of the present invention to provide an air conditioning system which may be operated safely by a worker working in close proximity to sources of electricity.

It is another object of the present invention to provide an air conditioning system which can drive and control the respective fans for an evaporator and a condenser without using electric power.

An air conditioning system according to the present invention includes a compressor, a condenser, an evaporator, a first fan for the condenser, and a second fan for the evaporator. A case which encloses at least the compressor, the condenser, the evaporator, the first fan and the second fan comprises an inner housing, and an outer housing which encloses the inner housing. Exposed portions which project on the outer surface of the outer housing and the outer housing are made of insulating materials.

BRIEF DESCRIPTION OF THE DRAWINGS

A more complete appreciation of the present invention and many of the attendant advantages thereof will be readily obtained as the invention becomes better understood by reference to the following detailed description when considered in connection with the accompanying drawings wherein.

DETAILED DESCRIPTION OF THE PREFERRED EMBODIMENTS

FIGS. 3, 4, 5, 6 and 7, show an air conditioning system in accordance with one embodiment of the present invention. The same numerals are used to denote parts which correspond to those in the above-described air conditioning system. Air conditioning system 10 comprises case 101 which includes partition plate 11. Partition plate 11 divides the interior of case 101 into upper housing 102 and lower housing 103. Case 101 includes outer casing 101a which is made of a plastic material and inner casing 101b which is enclosed by outer casing 101a and is made of hard metal. Outer casing 101a is fixed on inner casing 101b by securing bolts 101d through a plurality of brackets 101c. Four leg portions 101e project from the lower end surface of inner casing 101b through outer casing 101a. Bolts 101d are made of a plastic material and leg portions 101e are made of synthetic rubber. First inlet ports 12a and 12b are formed on outer and inner casings 101a and 101b, respectively, to introduce atmosphere to evaporator 70. The air introduced to evaporator 70 is sent to either upper passageway 60 or lower passageway 61 as described in detail below and flows out through either outlet ports 15a and 15b, which are formed in outer and inner casings 101a and 101b, or outlet port 110a which is formed in outer and inner casing 101a and 101b. Second inlet ports 13a and 13b are formed in outer and inner casings 101a and 101b, respectively, to introduce the atmosphere condenser 90. The air introduced to condenser 90 flows out through outlet ports 14a and 14b which are formed on outer and inner casings 101a and 101b respectively. Mesh members 101f, 101g, 101h and 101l, which are made of a plastic material, are disposed at inlet ports 12a and 13a and outlet ports 14a and 15a formed on outer casing 101a.

Figure 3:
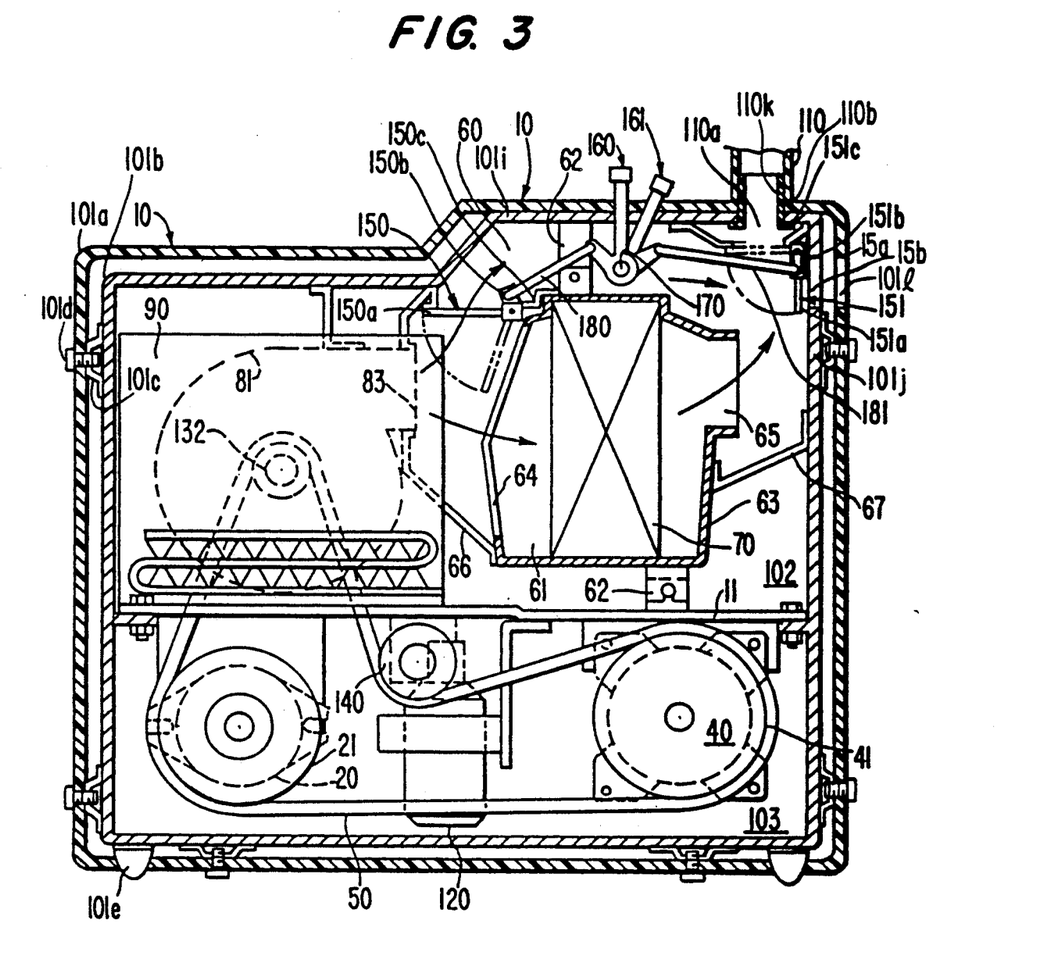
FIG. 3 is a vertical cross-sectional view of an air conditioning system for a working vehicle for operation on a live wire in accordance with one embodiment of this invention.
Figure 4:
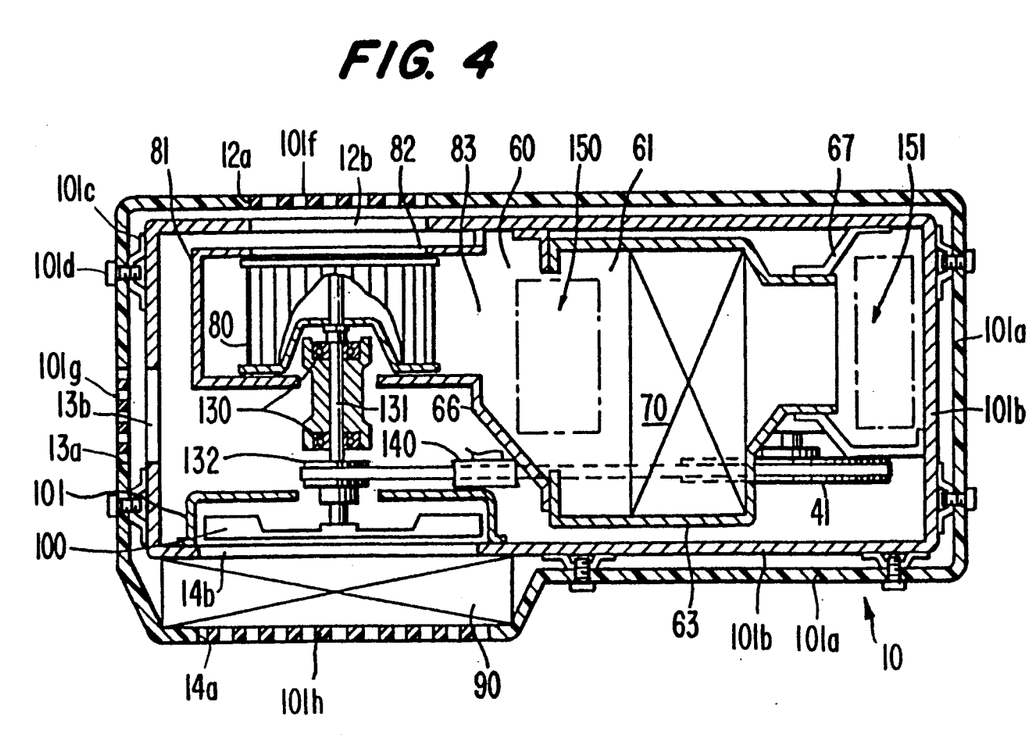
FIG. 4 is a horizontal cross-sectional view of an air conditioning system for a working vehicle for operation on a live wire as shown in FIG. 3.
Figure 5:
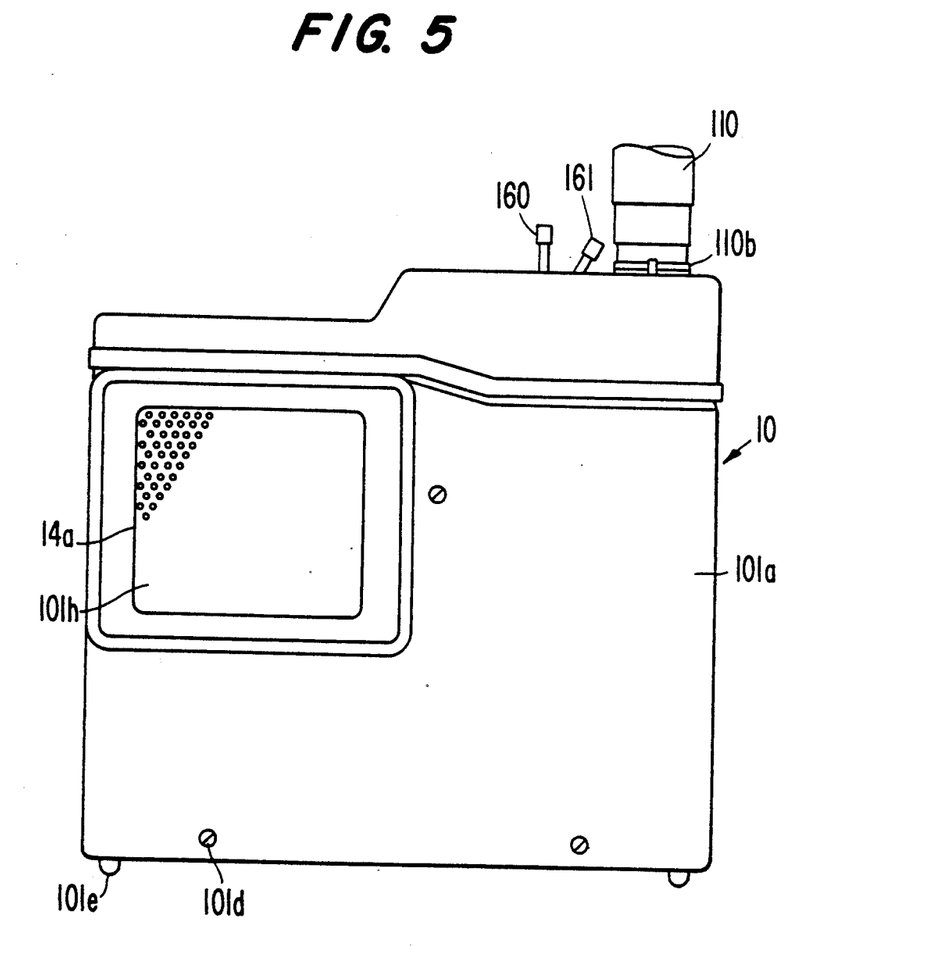
FIG. 5 is a front view of an air conditioning system for a working vehicle for operation on a live wire as shown in FIGS. 3 and 4.
Figure 6:
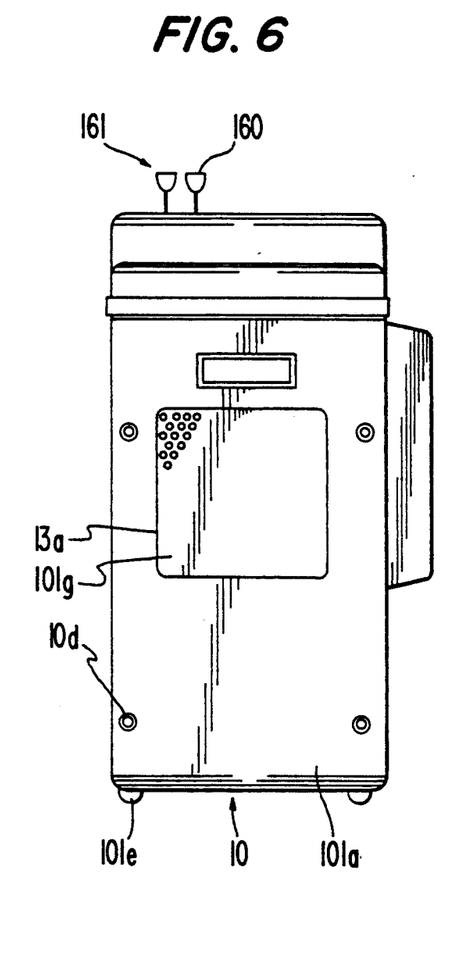
FIG. 6 is a left side view of an air conditioning system for a working vehicle for operation on a live wire as shown in FIG. 5.
Figure 7:
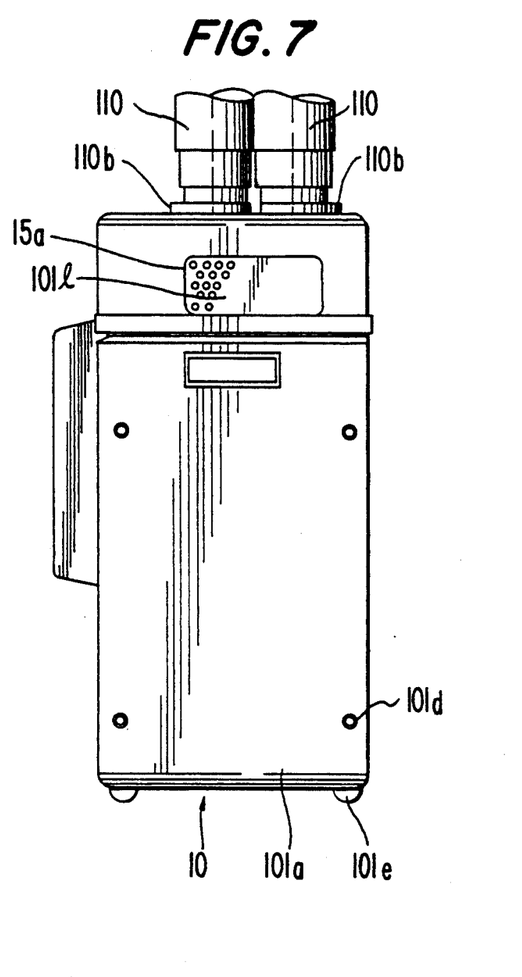
FIG. 7 is a right side view of an air conditioning system for a working vehicle for operation on a live wire as shown in FIG. 5.

Oil hydraulic motor 20, compressor 40 and receiver dryer 120 are mounted on the lower end surface of partition plate 11 in lower housing 103. Upper passageway 60, lower passageway 61, evaporator 70, fans 80 and 100, and condenser 90 are disposed in upper housing 102. Compressor 40, condenser 90, receiver dryer 120, and expansion valve (not shown) and evaporator 70 are connected in series and comprise a refrigerant circuit.

Fan 80 for evaporator 70 is disposed relative to fan 100 for condenser 90 as shown in FIG. 4. Fans 80 and 100 are coupled by a common drive shaft 131 and are covered by fan casing 81 and fan shroud 102, respectively. Drive shaft 131 includes small diameter pulley 132 and is supported by case 101 through bearing 130. Large diameter pulleys 21 and 41 are mounted on the drive shafts of motor 20 and compressor 40, respectively. Pulleys 21, 41 and 132 are coupled together by belt 50 through idle pulley 140. Thus, rotational force is transmitted to compressor 40 and fans 80 and 100 by the rotation of oil hydraulic motor 20. Lower passageway 61 is disposed below upper passageway 60 and includes cylindrical member 63 which is secured to an inner end surface of upper portion 101i of inner casing 101b and an upper end surface of partition plate 11 through a plurality of metal fittings 62. Evaporator 70 is disposed within lower passageway 60. Inlet port 64 is formed on one end of cylindrical member 63 and faces outlet port 83 of fan casing 81. Outlet port 65 is formed on the other end of cylindrical member 63 and faces side portion 101j of inner casing 101b. Cover plate 66 is disposed on the outer surface of outlet port 83 such that its upper end portion is connected to the inner surface of upper portion 101i of inner casing 101b and its lower end portion is connected to the lower end portion of inlet port 64 of cylindrical member 63. Cover plate 67 connects outlet port 65 of cylindrical member 63 with the inner surface of side portion 101j of inner casing 101b. Disposing cover plates 66 and 67 as described prevents air circulated by fan 80 from leaking into spaces other than upper and lower passageways 60 and 61.

Air mix damper mechanism 150 is disposed on the upper portion of cylindrical member 63. Damper mechanism 150 includes damper plate 150a, connecting part 150b, metal fitting 150c and pin 150d. One end of metal fitting 150c is fixedly secured to the upper end surface of cylindrical member 63 and its other end includes a hole. One end of connecting part 150b is attached to one end of damper plate 150a and the other end of the connecting part includes a hole. Pin 150d is inserted into the hole of metal fitting 150c and damper plate 150a is thereby rotatably supported by pin 150d.

The air flow which exits from outlet port 83 of fan casing 81 is divided by air mix damper 150 into two separate flows. One portion of the air flow from outlet port 83 is directed into upper passageway 60 and the other portion is directed into lower passageway 61. The air flow volume which is directed into each of the passageways 60 and 61 is controlled by changing the angle of damper plate 150a. The air which passes through lower passageway 61 is cooled by evaporator 70 and the air which passes through upper passageway 60 is not cooled. The air which passes through passageways 60 and 61 is subsequently mixed together. Accordingly, the control of the volume of air which is directed into the respective passageways permits control of the temperature of the air which flows from outlet port 110a to flexible hose 110. Flexible hose 110 is coupled to outlet port 110a through joint 110k and outlet ports 15a and 15b. Flexible hose 110 is fixed on joint 110k which is made of a plastic material.

Control damper mechanism 151 is disposed on side portion 101j. Control damper mechanism includes open and close damper plate 151a, connecting part 151b and metal fitting 151c. One end of metal fitting 151c is fixedly secured to the inner end surface of side portion 101j and the other end of fitting 151c includes projection 151d. Connecting part 151b is attached to one end of damper plate 151a and includes holes at both its sides. Projection 151d of metal fitting 151c is inserted into one hole of connecting part 151b, and thus damper plate 151a is rotatably supported at projection 151d.

The air flow from outlet port 65 of cylindrical member 63 is divided by damper plate 151a into two separate flows. One portion of the air flow from outlet port 65 is directed through outlet port 110a to flexible hose 110 and the other portion is directed through outlet port 15 which is formed in side portion 101j. The portion of the air flow which is directed to either 110a and 15 is determined by controlling the angle of damper plate 151a.

Operating levers 160 and 161 are secured to the end surface of upper portion 101j and movably supported member 170. Operating levers 160 and 161 respectively include first operating bars 160a and 161a, second operating bars 160c and 161c, and holes 160b and 161b to insert supporting member 170 therein. The first and second operating bars of operating levers 160 and 161 are integrally formed in a V-shape. One end of connecting rod 180 is rotatably connected to connecting part 150b and the other end of connecting rod 180 is rotatably connected to second operating bar 160c. Likewise, one end of connecting rod 181 is rotatably connected to connecting part 151b and the other end of connecting rod 181 is rotatably connected to one end of second operating bar 161c. Due to the above connections, air mix damper mechanism 150 and control damper mechanism 151 operate to change the angle of damper plates 150a and 151a in accordance with the operation of operating levers 160 and 161.

In the above-described embodiment, when oil hydraulic motor 20 is started, pulley 21 begins to rotate, and rotational force is transmitted to pulleys 41 and 132 through belt 50. Compressor 40 is driven by pulley 41, and refrigerant flows from compressor 40 and circulates through condenser 90, receiver dryer 120, an expansion valve (not shown) and evaporator 70. Fans 80 and 100 are driven together with drive shaft 131 by pulley 132. The atmosphere taken in by fan 80 passes through first inlet ports 12a and 12b of case 101 and inlet port 82 of fan casing 81 and subsequently flows into upper and lower passageways 60 and 61. The atmosphere which is taken in by fan 100 passes through second inlet ports 13a and 13b of case 101 and condenser 90 and subsequently flows out through outlet ports 14a and 14b.

During operation of compressor 40, if air mix damper 150 is rotated clockwise by moving first operating lever 160 toward the right side as in FIG. 4, the air flow volume into lower passageway 61 increases. This decreases the temperature of the air flow which flows from outlet port 110a into hose 110. On the other hand, if air mix damper 150 is rotated counterclockwise by moving first operating lever 160 in the opposite direction, the air flow volume into lower passageway 61 is decreased. Thus, the air flowing into hose 110 is not cooled as much. In this manner, the temperature of the air flow may be controlled.

In addition, the air flow volume into suit a may be controlled by the positioning of damper plate 151a through the use of operating lever 161. If damper plate 151a is rotated counterclockwise by moving lever 161 toward the right in FIG. 4, the air flow volume from outlet port 110a into hose 110 is increased since less air is directed through port 15. This increases the flow of air into suit a. If damper plate 151a is rotated clockwise by moving lever 161 toward the left in FIG. 4, the air flow volume from outlet port 110a into hose 110 is decreased. The decreases the flow of air into suit a. In the above construction, compressor 40, fans 80 and 100, and damper mechanisms 150 and 151 are not driven by electric energy. Therefore, this air conditioning unit may be used safely by those who work in close proximity to power lines and other sources of electricity. In addition, since the motors are not needed for fans 80 and 100, the cost of operating the air conditioning system may be reduced.

It should be noted that although the invention has been described for use by a worker working in close proximity to a source of electricity, the invention should not be limited in this respect. As noted such a system may be employed where it is desired to reduce the costs associated with an air conditioning system. Thus, the teachings of this invention may be used for a wide variety of applications.

Furthermore, outer casing 101a may be made of not only plastics and synthetic rubber, but also insulating materials such as ceramic, mica and wood. Leg portions 101e, mesh members 101f, 101g, 101h and 101l, and joint 110k may be integrally formed therewith. Additionally, outer casing 101a may be fixed on inner casing 101b without using bolts 101d.

This invention has been described in detail in connection with preferred embodiments, but these are example only and this invention is not restricted thereto. It will be easily understood by those skilled in the art that other variations and modifications can be easily made within the scope of this invention.

I claim:

1. In an air conditioning system including a compressor, a condenser, an evaporator, a first fan for the condenser, and a second fan for the evaporator, an improvement comprising:
    a case enclosing at least said compressor, said condenser, said evaporator, said first fan, and said second fan, said case including an inner housing for containing said compressor, said condenser, said evaporator, said first fan, and said second fan and an outer housing for enclosing said inner housing, said outer housing fixed to said inner housing and comprising an electrically insulating material.

2. The air conditioning system according to claim 1 wherein said outer housing comprises a plastic material.

3. The air conditioning system according to claim 1 wherein said outer housing comprises rubber.

4. The air conditioning system according to claim 1 wherein said outer housing comprises a ceramic material.

5. The air conditioning system according to claim 1 wherein said outer housing comprises mica.

6. The air conditioning system according to claim 1 wherein said outer housing comprises wood.

7. The air conditioning system according to claim 1 wherein said inner housing comprises metal.

8. In an air conditioning system for controlling the temperature of air supplied to an insulating suit worn by an individual to protect against electrical shock, said air conditioning system including a compressor, a condenser, an evaporator, a first fan for the condenser, and a second fan for the evaporator, an improvement comprising:
    a case enclosing at least said compressor, said condenser, said evaporator, said first fan, said second fan, said case including an inner housing for containing said compressor, said condenser, said evaporator, said first fan, and said second fan and an outer housing for enclosing said inner housing, said outer housing fixed to said inner housing and comprising an electrically insulating material.

9. The air conditioning system according to claim 8 wherein said outer housing comprises a plastic material.

10. The air conditioning system according to claim 8 wherein said outer housing comprises rubber.

11. The air conditioning system according to claim 8 wherein said outer housing comprises a ceramic material.

12. The air conditioning system according to claim 8 wherein said outer housing comprises mica.

13. The air conditioning system according to claim 8 wherein said outer housing comprises wood.

14. The air conditioning system according to claim 8 wherein said inner housing comprises metal.

15. The air conditioning system according to claim 1 further comprising:
    electrically insulating leg portions projecting from said inner housing through said outer housing.

16. The air conditioning system according to claim 1 further comprising:
    electrically insulating leg portions integrally formed with said outer housing.

17. The air conditioning system according to claim 1 wherein portions of said air conditioning system which project through said outer housing comprise electrically insulating materials.

18. The air conditioning system according to claim 8 further comprising:
    electrically insulating leg portions projecting from said inner housing through said outer housing.

19. The air conditioning system according to claim 8 further comprising:
    electrically insulating leg portions integrally formed with said outer housing.

20. The air conditioning system according to claim 8 wherein portions of said air conditioning system which project through said outer housing comprise electrically insulating materials.

21. An air conditioning system comprising:
a compressor;
a condenser;
an evaporator;
a first fan for the condenser;
a second fan for the evaporator;
a case enclosing at least said compressor, said condenser, said evaporator, said first fan, and said second fan, said case including an inner housing for containing said compressor, said condenser, said evaporator, said first fan, and said second fan and an outer housing for enclosing said inner housing, said outer housing fixed to said inner housing and comprising an electrically insulating material; and
electrically insulating leg portions projecting from said inner housing through said outer housing.

22. An air conditioning system comprising:
a compressor;
a condenser;
an evaporator;
a first fan for the condenser;
a second fan for the evaporator;
a case enclosing at least said compressor, said condenser, said evaporator, said first fan, and said second fan, said case including an inner housing for containing said compressor, said condenser, said evaporator, said first fan, and said second fan and an outer housing for enclosing said inner housing, said outer housing fixed to said inner housing and comprising an electrically insulating material; and
electrically insulating leg portions integrally formed with said outer housing.

23. An air conditioning system comprising:
a compressor;
a condenser;
an evaporator;
a first fan for the condenser;
a second fan for the evaporator;
a case enclosing at least said compressor, said condenser, said evaporator, said first fan, and said second fan, said case including an inner housing for containing said compressor, said condenser, said evaporator, said first fan, and said second fan and an outer housing for enclosing said inner housing, said outer housing fixed to said inner housing and comprising an electrically insulating material, wherein portions of said air conditioning system which project through said outer housing comprise electrically insulating material.

* * * * *